United States Patent [19]

Winter, III et al.

[11] 4,167,475
[45] Sep. 11, 1979

[54] FRACTIONATION PROCESS, CONTROL SYSTEM AND APPARATUS

[75] Inventors: George R. Winter, III, Mt. Prospect; Mark C. Anderson, Palatine, both of Ill.

[73] Assignee: UOP Inc., Des Plaines, Ill.

[21] Appl. No.: 868,967

[22] Filed: Jan. 12, 1978

[51] Int. Cl.² .......................... B01D 3/42; B01D 3/00; C10G 7/00
[52] U.S. Cl. .................................. 208/355; 196/132; 196/133; 202/160; 202/163; 203/2; 203/71; 208/358
[58] Field of Search ................ 196/132, 133; 202/160, 202/163; 203/2, 84, 71; 208/358, 364, 350, 355

[56] References Cited

U.S. PATENT DOCUMENTS

| | | | |
|---|---|---|---|
| 2,022,809 | 12/1935 | Kramer | 203/2 |
| 2,323,047 | 6/1943 | Jewell | 208/358 |
| 2,467,951 | 4/1949 | Whitley | 202/160 |
| 3,412,016 | 11/1968 | Graven | 208/358 |
| 3,475,287 | 10/1969 | DeGraff | 202/160 |

Primary Examiner—Herbert Levine
Attorney, Agent, or Firm—James R. Hoatson, Jr.; John F. Spears, Jr.; William H. Page, II

[57] ABSTRACT

A process, apparatus and control system for the fractionation of a hydrocarbon feed stream containing relatively nonvolatile impurities. A sidecut liquid stream which is substantially free of the impurities is withdrawn below the feed point. The liquid derived from the feed stream is confined to a first lateral half of the fractionation column to prevent the transfer of the nonvolatile impurities to the second lateral half from which the sidecut is removed. Liquid descending from above the feed point is collected and distributed between the two lateral halves of the column in response to temperature measurements taken in the two halves to thereby equalize liquid flow rates in the two halves. The flow of vapor between the two halves is not obstructed.

10 Claims, 4 Drawing Figures

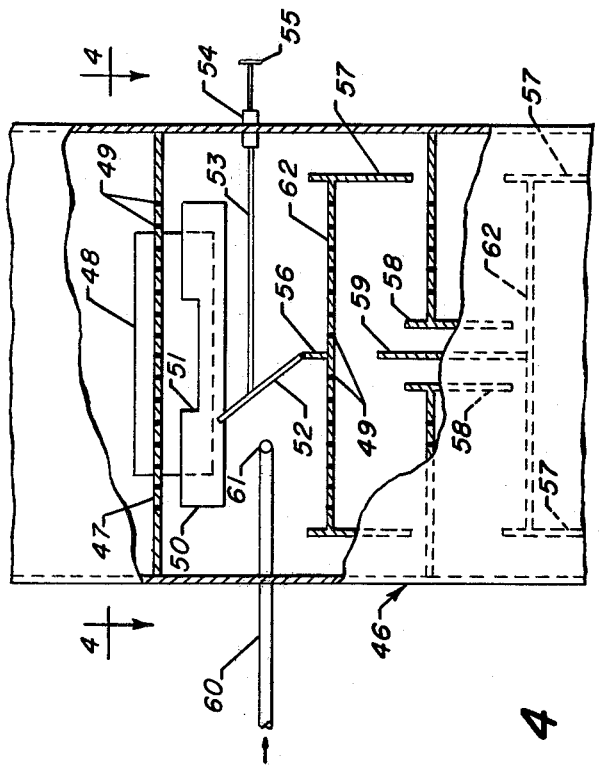
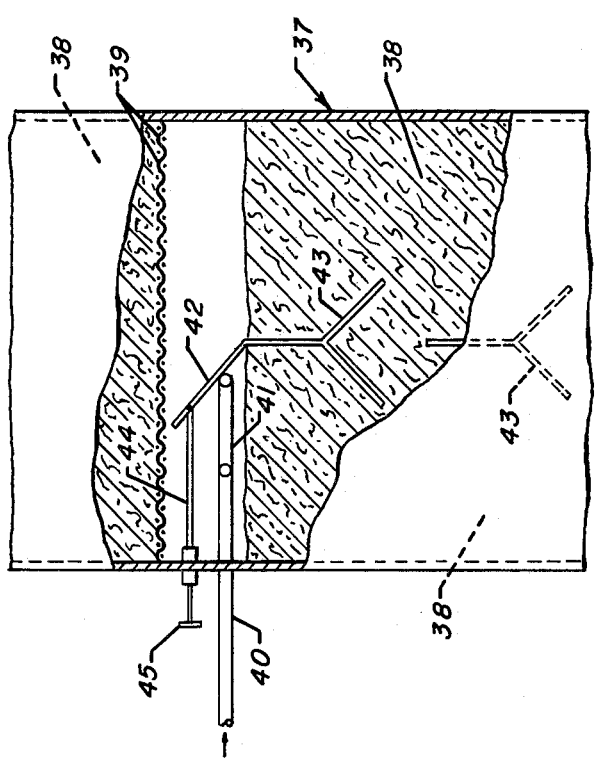

FRACTIONATION PROCESS, CONTROL SYSTEM AND APPARATUS

FIELD OF THE INVENTION

The invention pertains to a process for the fractionation of mineral oils and to an apparatus for vapor liquid contacting. The invention also relates to an apparatus and process for the separatory distillation of a mixture of distillable compounds wherein the mixture contains a substance nonvolatile in relation to the distillable compounds. The invention therefore relates to processes such as those found, for instance, in Classes 203 and 208. The invention also relates to a control system for use on a fractionation column.

PRIOR ART

Fractionation is one of the oldest and most highly developed areas of petroleum, petrochemical and chemical processing. Accordingly, the knowledge required to design, manufacture and operate fractionation columns and their accouterments is possessed by those skilled in the art and is available from a great many references. A substantial statement of this knowledge is provided by the Fourth Edition of *The Chemical Engineers' Handbook* published by McGraw-Hill Book Co., New York, N.Y.

Representative examples of the prior art are presented in U.S. Pat. Nos. 2,134,836 and 3,338,825 (Cl. 208-350). These references illustrate the use of fractionation trays, the use of reflux and reboiler systems and the withdrawal of liquid sidecuts from intermediate points in the column. U.S. Pat. No. 3,766,021 (Cl. 203-39) illustrates a fractionation column which has been adapted for use with heavy immiscible residues in the feed system with the object of preventing or limiting their contact with the reboiler.

U.S. Pat. Nos. 3,314,879 (Cl. 208-356) and 3,846,249 (Cl. 196-111) present crude oil fractionation columns designed for the simultaneous fractionation of two or more crude oils when intermixing of the reduced crude bottoms streams is not desired. These references utilize imperforate baffles which divide the bottom section of the columns into separate fractionation zones. Further fractionation to produce various light products, such as gas oils, is performed in a common fractionation zone located above these segregated zones. The crude oil enters near the bottom of the column and the descending liquid derived from the feed is therefore confined to one lateral half of the column. However, there is no vapor admixture in these lower segregated zones and there is no equivalent collection and distribution of liquid descending from above the feed point.

Examples of fractionation column control systems are shown in U.S. Pat. Nos. 3,855,074 (Cl. 203-2) and 3,905,874 (Cl. 203-1).

BRIEF SUMMARY OF THE INVENTION

The invention provides an apparatus and a process for the fractionation of a feed stream containing a relatively nonvolatile impurity wherein a liquid sidecut which is substantially free of the impurity is removed below the feed point. To accomplish this a section of the column immediately below the feed point is divided into a first and a second lateral half by a liquid segregation means such as vertical baffles located on the fractionation trays. The liquid flowing downward from the feed point is thereby divided into two internal liquid streams. In contrast, the vapors rising upward through the column are intermixed between the two lateral halves.

All of the feed stream is used to form one of the internal liquid streams. The liquid sidecut is withdrawn from the other internal liquid stream, which is derived from liquid which has been vaporized at some point within the column. The liquid flowing downward through the column above the feed point enters an adjustable liquid collection and distribution means and is preferably divided into two unequal portions. The larger portion is used to form the internal liquid stream from which the sidecut stream is removed. The relative flow rates of the two portions is adjusted to provide uniform liquid coverage or flow rates in the two lateral halves of the column. This is controlled by measuring and comparing the temperature of the liquid or vapor present at the same, or corresponding, locations in the two lateral halves of the column. The proper interpretation of any difference in these two temperatures indicates the required ajustment to the division of the collected liquid.

BRIEF DESCRIPTION OF THE DRAWING

FIG. 2 is a cross-sectional view of a portion of a packed fractionation column 37 in which different liquid segregation means and liquid collection and distribution means are used.

FIG. 3 is a cross-sectional view of a portion of a trayed fractionation column 46 in which a third type of liquid collection and distribution means is utilized.

FIG. 4 is a cross-sectional view of the column of FIG. 3 taken along line "4-4" and presents the view seen looking downward toward the fractionation tray immediately above the feed point.

DETAILED DESCRIPTION

Figure 1:
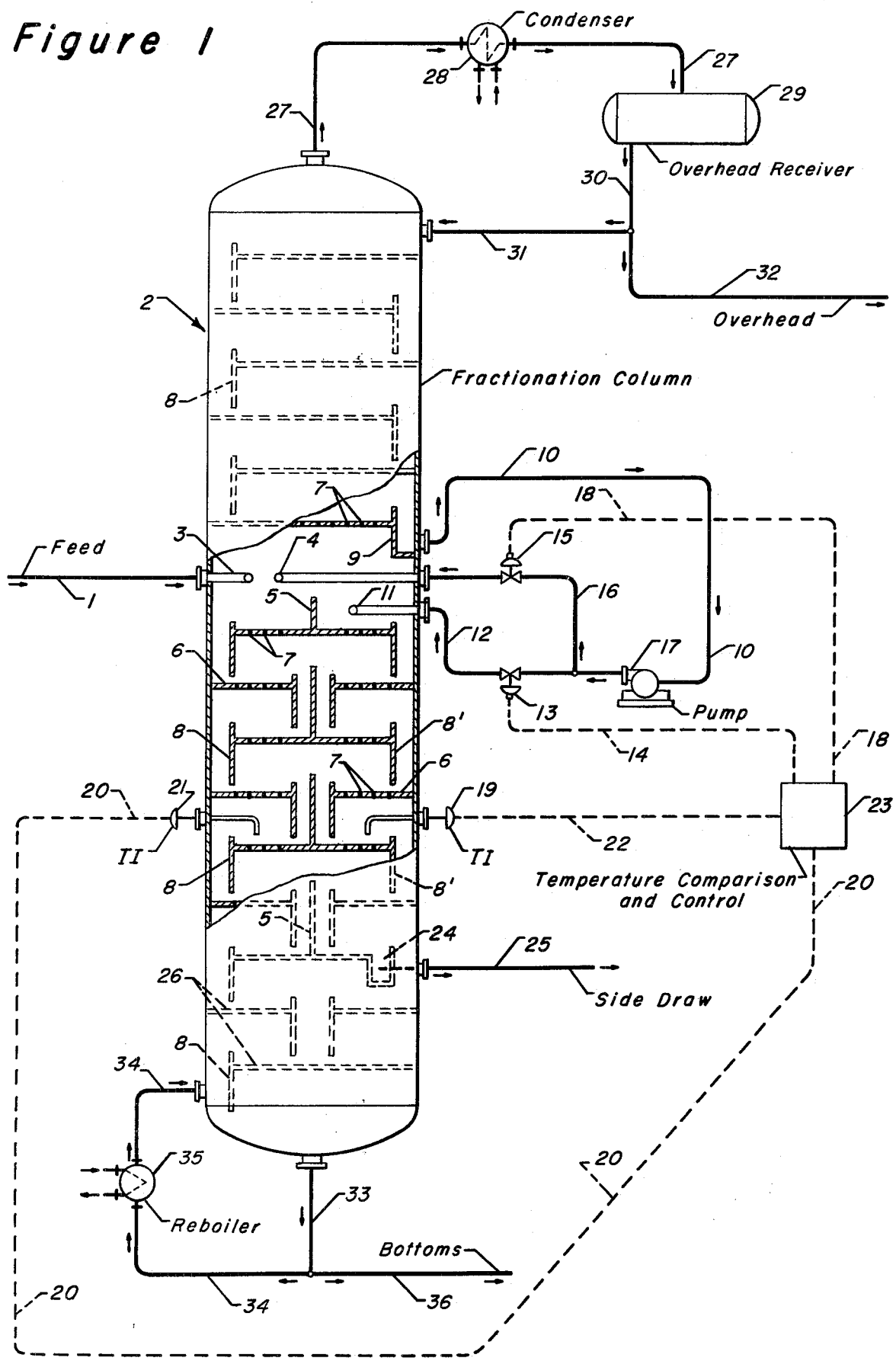
FIG. 1 presents a partial cross-section of a trayed fractionation column 2 in which the apparatus and control system of the present invention are used to produce a sidedraw liquid removed in line 25 which does not contain nonvolatile impurities entering with the feed stream of line 1.

In the fractionation of various petroleum or chemical industry process streams the situation is occasionally encountered in which the feed stream contains a relatively nonvolatile susbtance considered to be an impurity or contaminant. It may be desired in these situations to remove a stream of liquid free of this impurity from the fractionation column at a point below the feed point. The various embodiments of the subject invention find utility in these fractionation operations.

One prior art method of removing an impurity-free sidedraw stream is to remove a vapor stream from the column. This is effective since the nonvolatile impurity will not be present in the vapor phase. However, this method requires an increase in the expenditure of heat equal to the sidecut rate times the latent heat of vaporization of the sidecut stream. If a liquid sidecut stream is removed, the concentration of the impurity is reduced only by dilution with the liquid in addition to the feed descending the column for the purpose of the fractionation operation, producing a concentration of the impurity in the sidecut stream equal to the concentration of the impurity in the feed multiplied by the ratio of feed to internal reflux at the draw point. To increase the dilution factor requires an expenditure of heat to produce more reflux. The nonvolatile impurity can alternatively be removed from the sidecut stream externally, as by fractionation, but this is also relatively expensive.

It is therefore an objective of this invention to provide an energy-efficient process for fractionating a feed stream containing a nonvolatile impurity which permits the withdrawal of a substantially impurity-free liquid sidecut below the feed tray. It is another objective of this inventiion to provide an apparatus for the fractionation of a feed stream containing a nonvolatile impurity. It is yet another objective of the invention to provide a fractionation apparatus in which the liquid flowing downward from an intermediate feed point is segregated into two internal streams but the upward flowing vapors are not so segregated. Another objective of the invention is to provide a method of regulating the operation of a fractionation column having two internal liquid streams which are not intermixed.

As used herein the terms "nonvolatile" or "relatively nonvolatile" are intended to indicate that substantially all of the substances so described remains in a liquid state or in a liquid phase solution at the fractionation conditions which are utilized in the column. A substance characterized herein by these terms is to be one which has a boiling point, measured at one atmosphere pressure, at least 25 Centigrade degrees higher than that of the heaviest desired component of the sidecut stream.

It is recognized that this second definition is only a supplement to the first since the identity and boiling point of the impurity or impurities may not be known accurately. The impurity may also not have a true or actual boiling point at one atmosphere of pressure due to the requirement of a subatmospheric pressure to vaporize the substance. Also, the impurities may be solid particles not susceptible to meaningful classification by boiling point.

The nonvolatile impurity may therefore be entrained catalyst or adsorbent particles including fluidized catalytic cracking catalyst. These particles could also be charcoal or zeolitic material which has become admixed with the fractionator feed stream in fluidized or moving-bed solid-fluid contacting operations. The impurity may also be a small amount of a homogeneous catalyst carried over from a reaction zone. As another example, the impurity can be a small amount of asphaltenes which are present in a stream of light aromatic hydrocarbons such as benzene and toluene. One impurity of particular concern is found in the extract stream of a process using molecular sieves to recover normal olefins. This impurity is contained in a stream which may contain from $C_{10}$ to $C_{15}$ normal olefins and also contains the desorbent used to remove the olefins from the sieves. The desorbent is removed from the fractionation column as an overhead product. The nonvolatile impurity in this particular example is a dark colored, high molecular weight material which is very easily separated from the other materials by fractionation and collects as a residue in the bottom of the column. Its exact composition is unknown, but it is believed to be a polynuclear aromatic hydrocarbon. It is considered an impurity due to its tendency to discolor the desired olefin products.

In the subject invention the feed stream enters the fractionation column at an intermediate vertical point. That is, the point at which the feed stream enters is separated from both the upper and lower ends of the column by two or more fractionation trays or an amount of packing equal to at least one and one-half theoretical trays or separation stages. The column is reboiled in a customary manner through the use of either an internal or external reboiler. Heat is removed, also in a customary manner, at the top of the column by either a stabbed-in condenser or an external condenser in an overhead vapor removal line.

The column is maintained at fractionation conditions selected to aid in the separation of the feed stream into two or more product streams of different composition. A broad range of fractionation conditions includes a pressure of from subatmospheric to about 180 atmospheres and a bottoms temperature of from about 50 to 350° C. A preferred set of fractionation conditions has a pressure range of from 0.5 to 32 atmospheres gauge and a temperature range of from 120° to 280° C. The reflux ratio is preferably within the range of from 1.0:1 to about 5:1. Other conditions, such as vapor velocity, liquid loadings and tray or packing designs, may be those which are customary and within the expertise of those skilled in the art to select.

The feed stream may be fed to the column in a normal manner, but the liquid in the feed stream is prevented from traveling horizontally across the entire cross-section of the column by appropriate mechanical means. The liquid derived from the feed stream will contain essentially all of the nonvolatile impurity,. This liquid is confined to one lateral section of the column's horizontal cross-section, and thereby the nonvolatile impurity is prevented from reaching the other lateral section of the column. As used herein the terms such as the first lateral section or first lateral half of a tray or the column are intended to refer to that portion on which the liquid derived from the feed stream is retained. This section may vary from about 30 to 60% of the total cross-section of the column. Preferably, the division of the column into two lateral halves or sections is delineated by a single vertical plane passing through the internal volume of the column. In a narrow embodiment of the invention this plane intersects the central vertical axis of the column. This liquid flowing downward through the first lateral section is referred to herein as the first interal liquid stream. The liquid flowing through the second lateral section is referred to herein as the second internal liquid stream.

The vapor flow upward through the portion of the column divided into the two lateral sections is not segregated. Preferably, the vapor is allowed or forced to intermix between fractionation stages to provide a uniform vapor composition in all lateral sections. The amount of intermixture in a trayed column will normally exceed that in a packed column, but in either case horizontal perforations or passageways are to be provided in the liquid segregation means to permit or promote horizontal vapor movement. This may be done in a number of ways including those illustrated in the drawing. As shown in FIG. 1, it is not required that the vapor be admixed between every tray of a column. This is due to the requirement that a vapor seal be provided at the bottom of the unitary, central downcomer of the embodiment shown in this Figure in order to prevent vapor from rising through the downcomer. An auxiliary vapor conduit located either inside or outside of the column may be provided in this instance to allow some vapor mixture and to equalize pressures. This conduit would connect the two lateral halves of the column, and its use is not preferred. The division of the column into two lateral sections by the liquid segregation means is confined to that portion of the column which is between the feed point and the lower liquid collection trap at which the sidecut stream is removed. The vapor-liquid contacting means, that is, the trays or packing, located above and below this portion of the column have a normal configuration.

The liquid which is traveling downward through the vapor-liquid contacting means located immediately above the feed stream inlet is collected for use as the second internal liquid stream. In a well designed column the composition of this collected liquid will be close to that of the feed stream. The second internal liquid stream is formed exclusively by the condensation of vapor above the feed tray, and therefore will be essentially free of the nonvolatile impurity. All of the collected liquid may be directed into the second lateral section of the column for use as the second internal liquid stream. However, it is preferred that the collected liquid is divided into two portions, with a second portion being admixed with the feed stream. It is essential that the flow rate of the second internal stream be equal to or in excess of the sidecut draw rate.

The relative flow rates of the first and the second internal liquid streams are to be adjusted to provide equal vapor/liquid ratios in both lateral sections of the column. That is, the rate of liquid flow across effective vapor-liquid contacting areas should be equal. Balancing this variable should result in approximately equal degrees of separation. If a trayed apparatus is used, a substantially equal liquid depth on both lateral sections is preferred. This is to prevent the vapor from bypassing those trays having a greater liquid depth and "blowing" through the trays having a deficient liquid level.

The entire second internal liquid stream may be removed as the liquid sidecut stream. Alternatively, only a portion of this internal liquid stream may be removed, with the remaining portion being admixed with the first internal liquid stream at a location below the point at which the liquid sidecut stream is withdrawn.

One embodiment of the invention may therefore be described as a process for fractionating hydrocarbons which comprises the steps of passing a feed stream comprising a mixture of volatile liquids and a relatively nonvolatile impurity into a fractionation column operated at fractionation conditions at a first intermediate point, the feed stream being passed into the column on a first lateral half of a first fractionation tray which is separated from a second lateral half of the first fractionation tray by a vertical imperforate baffle which extends upward from the surface of the tray to a height sufficient to prohibit passage of feed liquid to the second lateral half of the first fractionation tray; removing an overhead vapor stream from the fractionation column, at least partially condensing the overhead stream to form an overhead liquid, and passing a reflux stream comprising overhead liquid into the fractionation column; adding heat to the bottom of the fractionation column through the use of a reboiler and withdrawing a net bottoms stream comprising the relatively nonvolatile impurity from the fractionation column; collecting the downward flowing liquid traffic leaving the fractionation tray immediately above the first fractionation tray and passing at least a first portion of the collected liquid onto the second lateral half of the first fractionation tray, the first portion of the collected liquid having a flow rate sufficient to provide an equal liquid loading on the first and the second lateral halves of the first fractionation tray, with the first portion of the collected liquid remaining out of contact with liquid on the first lateral half of the first fractionation tray; passing a first internal liquid stream comprising the relatively nonvolatile impurity downward from the first lateral half of the first fractionation tray to the first lateral half of a second fractionation tray located immediately below the first fractionation tray and passing a second internal liquid stream which is substantially free of the relatively nonvolatile impurity downward from the second lateral half of the first fractionation tray to the second lateral half of the second fractionation tray; repeating the segregated transfer of the internal liquid streams at subsequent lower fractionation trays to provide the parallel downward flow of the first and second internal liquid streams within the fractionation column; passing vapor of substantially uniform composition upward through the first and the second lateral halves of the second fractionation tray, mixing the vapor which has passed through the first and second lateral halves of the second fractionation tray, and passing the resultant admixed vapor through the first and second lateral halves of the first fractionation tray; and withdrawing a liquid sidecut stream comprising at least a portion of the second internal liquid stream from the fractionation column at a point below the second fractionation tray.

Other embodiments of the invention are shown by the Drawing. In FIG. 1 the preferred embodiment of the invention is presented. A hydrocarbon feed stream enters a vertically aligned trayed fractionation column 2 through line 1. The feed stream is divided into several smaller streams by an inlet distribution nozzle 3 and falls upon the feed tray. This column is maintained at conditions required for the fractionation of the feed stream by the vaporization in a reboiler 35 of at least a portion of the bottoms liquid carried by line 34. Vapors containing the lighter components of the feed stream rise through a number of fractionation trays 26 and are removed as an overhead vapor stream carried by line 27. This vapor stream is passed through a condenser 28 and then directed into an overhead receiver 29. Uncondensed vapors are removed by a line not shown. The condensed overhead liquid is drained in line 30, and divided into a reflux stream carried by line 31 and a net overhead product stream removed in line 32.

The feed stream falls onto the first lateral half of a two-pass fractionation tray 6. The first lateral half of the tray is separated from the second lateral half by an imperforate vertical wall 5 attached to the upper surface of the tray. The upper edge of this wall is located at a higher elevation than the weir at the upper end of the downcomers associated with this tray. Liquid descending through the upper portion of the column is collected in a blanked-off downcomer 9 at the tray immediately above the feed tray. It is withdrawn from the column through conduit 10 and pressurized in a pump 17. The collected liquid is then divided into the two conduits 12 and 16 at rates set by valve means 13 and 15 respectively. The collected liquid is therefore distributed between the first and the second lateral halves of the feed tray through inlet conduits 4 and 11, which may terminate in suitable liquid distributors.

A first internal liquid stream overflows the outlet weir located on the first lateral half of the feed tray and flows downward through a downcomer 8. A second internal liquid stream overflows the outlet weir on the second lateral half of the feed tray and also descends through a downcomer 8', but is directed to the second lateral half of the fractionation tray located immediately below. Each internal liquid stream remains within its respective lateral half of the column and is contacted with vapor rising through perforations 7 within the contacting area of the tray. The internal liquid streams then flow downward through a single central downcomer but are segregated by the vertical wall or baffle 5. The vapor rising through the two lateral halves of the column is allowed to intermix by passing over the top of the vertical wall 5. This wall is to rise to a height above the outlet weirs of the tray from which liquid is descending, but preferably is to terminate below the tray next above. If it abuts the next above tray, in this instance the feed tray, sizable vapor passageways are to be provided in the upper portion of the wall. In this manner the nonvolatile impurities in the feed stream are confined to the first internal liquid stream and do not enter the second internal liquid stream. Both streams are, however, fractionated at the same conditions and contacted with vapor of substantially equal composition.

A signal representative of the temperature of the first and the second internal liquid streams is generated by temperature sensing means 19 and 21 respectively. Preferably, these sensing means comprise resistance bulbs immersed in the liquid on opposite lateral halves of a single fractionation tray. The temperature readings are therefore preferably taken at the corresponding, that is same or mirror image, locations on the two lateral sides of the column. This is not, however, required if due compensation is made during the subsequent comparison of the two tempertures. The temperatures may also be determined with the sensing means in contact with the vapor phase present in the column. The first and second signals may also be generated by the use of two or more temperature sensors in each lateral section of the column to provide for operation using a multi-temperature control mode.

Irrespective of the mechanical arrangement utilized to generate the two signals, they are transmitted through appropriate means to a temperature comparison and control device 23. The signals to and from this device may be either electrical or pneumatic, and therefore the interconnecting signal transfer means 20, 22, 14 and 18 may be either electrically conductive wire or sealed conduits. The control device may be of the analog, digital or fluidic variety. It may be integrated with or be part of the control system used to regulate the rate of reflux and heat addition in the column.

The comparator and controller 23 generates signals, carried by means 14 and 18, which activate the valves controlling the division of the collected liquid. These signals are preferably varied in a manner which serves to equalize the temperature of the first and second internal liquid streams when measured at the same elevation below the feed tray. Adjustment to equalize the temperature of the two internal liquid streams also serves to equalize the degree of fractionation on the two lateral sides of the column.

The adjustment of the distribution of the collected liquid between the two lateral sides of the column may be achieved through the use of a single signal which is generated by the controller. This third signal, referring now to the temperature indications as the first and second signals, may be transmitted to a single valve located in either line 12 or 16. The remaining line would be provided with a suitable fixed flow restriction. Adjustment of the valve will then vary the division of the collected liquid between the two lines. Alternatively, a single continuously variable valve which splits the flow between two outlet lines may be driven by the controller output signal. As another alternative, one valve may be controlled in response to a signal generated by comparing the temperature of the two internal liquid streams while the other valve or the pump is controlled in response to a signal representative of a liquid level within the column. The mechanical liquid collection and distribution means shown in FIGS. 2 and 3 are directly adaptable to adjustment according to a single signal.

The liquid sidecut is removed at a location which provides the desired amount of fractionation of the liquid falling from the feed tray. It is preferably removed from a blanked off downcomer or a collection trap 24 and is removed as a substantially impurity-free product in line 25. The first internal liquid stream falls upon a fractionation tray 26. That portion of the second internal liquid stream which is not removed in line 25 overflows the collection trap and also falls upon the tray below. A bottoms stream removed in line 33 is divided between the reboiled material and a net bottoms stream removed in line 36.

FIG. 2 presents a different mechanical embodiment of the invention. In this embodiment the vapor-liquid contacting means comprises a commercially available packing material 38. An upper bed of packing is held above the feed stream inlet conduit 40 by a horizontal screen 39 which conforms generally to the inner surface of the fractionation column 37. A lower bed of packing is positioned below the inlet liquid distribution nozzle 41 which is connected to conduit 40. The feed stream falls upon the first lateral section of the column and descends through the packing countercurrent to rising vapors.

Liquid descending from above the feed point passed through the screen. At least a portion of the liquid descending from above the feed point of the column falls upon an imperforate tiltable plate 42, which forms part of the liquid collection and distribution means of this embodiment. The falling liquid which collects on the plate is directed to the second lateral section of the column. The lower horizontal edge of the plate is preferably hinged to the top of a vertical portion of the liquid segregation means 43. The division or distribution of the descending liquid is determined by the angle of the plate since this angle determines the percentage of the column's cross-section which the plate covers. The angle of the plate is adjustable by the movement of rod 44, which extends out of the column through a suitable packing box. An automatic controller may be attached to the exposed end 45 of the rod.

The two parallel internal liquid streams are prevented from intermixing by the plurality of vertically spaced imperforate liquid segregation means provided in the lower bed of packing. These means have the shape of inverted Y's and are spaced at vertical intervals which are sufficiently close to inhibit liquid leaving the lower end of one means from traveling horizontally far enough to pass over the upper end of the next lower means. The liquid segregation means are spaced to provide horizontal vapor passageways and should extend across the width of the column and be centered above those below.

In FIG. 3, a mechanical liquid collection distribution and collection means for use in a trayed fractionation column 46 is presented. The impurity-containing chemical or hydrocarbon feed stream enters through line 60 and is spread across the first lateral half of a two-pass fractionation tray 62 by a distributor 61. The feed stream is retained on the left-hand side of the column by an imperforate weir 56 attached to the upper surface of the feed tray. The majority of the liquid descending from above the feed tray falls upon the second lateral half of the tray and flows downward through a downcomer 57. The first and the second liquid streams flow horizontally across the next lower tray in opposite directions to a single central downcomer 58. The intermixture of the two internal liquid streams is prevented at this point by a vertical wall 59 which is similar to that described in reference to FIG. 1. On each fractionation tray the liquid is contacted with vapor rising through perforations 49.

The liquid flowing across the single-pass fractionation tray 47 located above the feed tray enters a chordal outlet downcomer 48. The bottom of this downcomer empties into a liquid collection trough 50, which has upper edges above the bottom of the downcomer to provide a liquid seal. A rather broad horizontal notch 51 is placed along the upper inner edge of the trough to serve as a spout which directs the flow of liquid out of the trough. This notch may be off-center.

Collected liquid flowing out of the notch falls downward upon a tiltable imperforate liquid diversion plate 52 which operates to divide the collected liquid in a manner similar to plate 42 of FIG. 2. The bottom edge of this plate is hinged to the top of the weir 56, and the plate is varied in angle by the horizontal movement of connecting rod 53 through seal 54. Preferably, an automatic adjustment device attached to the outer end 55 of the connecting rod is activated in response to a signal generated at the temperature comparator and controller not shown. The tiltable liquid diversion plate 52 may be adjusted by the connecting rod to distribute all or just a portion of the liquid collected in the trough to the second lateral side of the column.

FIG. 4 presents a cross-section of the column 46 of FIG. 3 taken along section line 4—4 and looking downward at the fractionation tray 47 located immediately above the feed tray. The liquid on this tray is contacted wtih vapor rising through the perforations 49. It leaves the upper surface of the tray by flowing into the upper open end of a chordal downcomer 48. The liquid is collected in the trough 50 which surrounds the lower end of the downcomer. The liquid exits the trough through the notch 51 and falls toward the feed tray. The liquid is distributed between the first and the second lateral halves of the column by the tiltable diversion plate 52. The lower edge of this plate is pivotably mounted to the top of the weir 56. The connecting rod 53 extends through the seal 54 to an outer end 55. This end of the connecting rod may be attached to a push-pull type of adjustment device. Alternatively, the connecting rod may be threaded, and the adjustment device may rotate the connecting rod to cause its lateral movement through a mating threaded section located in the seal 54. Manual adjustment by rotating the connecting rod may also be provided for.

The liquid segregation means functions in cooperation with other parts of the column's internal elements and utilizes the natural downward flow of liquid where possible to minimize the structural members required within the column. These other parts of the column therefore act as part of the liquid segregation means, and in this manner the liquid segregation means extends continuously between the tray immediately below the liquid inlet nozzle to the liquid collection trap.

The second internal liquid stream and the liquid sidecut stream are both referred to herein as being substantially free of the nonvolatile impurity. Recognizing that the impurity may be admixed into these streams, as by liquid droplets entrained in vapor or froth moving horizontally through the column, and also that commercial standards of purity often vary from the high level which may be obtained on a small scale, it is intended to utilize this characterization of the liquid streams in a relative sense. The ratio of the concentration by weight of the impurity in the feed stream to the concentration by weight of the impurity in the two impurity-free streams is therefore at least 50:1 and preferably is over 100:1.

We claim as our invention:

1. A fractionation process which comprises the steps of:
   (a) passing a feed stream comprising a mixture of at least two volatile chemicals and a relatively nonvolatile impurity into a fractionation column operated at fractionation conditions at a first intermediate point, the feed stream being passed into the column on a first lateral section of a first fractionation tray which is separated from a second lateral section of the first fractionation tray by a vertical imperforate baffle which extends upward from the surface of the tray to a height above that of any outlet downcomer associated with the first fractionation tray;
   (b) removing an overhead vapor stream from the fractionation column, at least partially condensing the overhead stream to form an overhead liquid, and passing a reflux stream comprising overhead liquid into the fractionation column;
   (c) adding heat to the bottom of the fractionation column through the use of a reboiler and withdrawing a sole net bottoms stream from the bottom of said fractionation column comprising the relatively nonvolatile impurity from the fractionation column;
   (d) collecting the downward flowing liquid leaving the fractionation tray immediately above the first fractionation tray and passing at least a first portion of the collected liquid onto the second lateral section of the first fractionation tray, the first portion of the collected liquid having a flow rate sufficient to provide an equal liquid loading on the first and the second lateral sections of the first fractionation tray, with the first portion of the collected liquid remaining out of contact with liquid on the first lateral section of the first fractionation tray;
   (e) passing a first internal liquid stream comprising the relatively nonvolatile impurity downward from the first lateral section of the first fractionation tray to the first lateral section of a second fractionation tray located immediately below the first fractionation tray and passing a second internal liquid stream which is substantially free of the relatively nonvolatile impurity downward from the second lateral section of the first fractionation tray to the second lateral section of the second fractionation tray;
   (f) repeating the operations of step (e) at subsequent lower fractionation trays to provide the parallel downward flow of the first and second internal liquid streams within the fractionation column;

(g) passing vapor of substantially uniform composition upward through the first and the second lateral sections of the second fractionation tray, admixing the vapor which has passed through the first and second lateral sections of the second fractionation tray, and passing the resultant admixed vapor through the first and second lateral sections of the first fractionation tray; and, (h) withdrawing a liquid sidecut stream comprising at least a portion of the second internal liquid stream relatively free of nonvolatile impurities from the fractionation column at a point below both the feed inlet and second fractionation tray and above the bottom portion of said fractionation column.

2. The process of claim 1 further characterized in that the first portion of the collected liquid which is passed onto the second lateral section of the first fractionation tray has an average flow rate which is greater than the average flow rate of the liquid sidecut stream.

3. The process of claim 1 further characterized in that all of the second internal liquid stream is removed as the liquid sidecut stream.

4. A method for regulating the operation of a fractionation column which comprises the steps of:

(a) passing a feed stream comprising volatile chemical compounds and a relatively nonvolatile impurity into a first lateral section of a fractionation column containing means for maintaining two separate internal liquid streams below the feed point to the column, with a first internal liquid stream being maintained in the first lateral section of the column, and with a second internal liquid stream which is substantially free of the nonvolatile impurity being maintained in the second lateral section of the column;

(b) withdrawing from said fractionation column a vapor stream at the upper end of said column, a sole net bottoms stream at the lower end of said column comprising a liquid from said first lateral half of said column comprising said nonvolatile impurities and a liquid sidecut stream at a point intermediate said lower and upper ends of said column and below said point of feed stream passage to said column, said intermediate liquid sidecut stream being substantially free of said nonvolatile impurities;

(c) generating a first signal representative of the temperature of the first internal liquid stream at a point below the feed point;

(d) generating a second signal representative of the temperature of the second internal liquid stream at a point corresponding to the point at which the temperature of the first internal liquid stream is monitored to generate the first signal;

(e) transmitting the first and the second signals to a means for generating as an output at least a third signal corresponding to the difference between the temperatures represented by the first and second signals;

(f) transmitting at least the third signal to a liquid flow control means capable of bifurcating the liquid flow downward through the column just above the feed point and distributing a variable portion of the liquid flow between the first and the second lateral sections of the column; and, (g) adjusting, through use of the liquid flow control means, the rate of flow of the first and the second internal liquid streams in response to said third signal in a manner which tends to equalize the temperature of said first and said second internal liquid streams when measured at the same vertical elevation of said fractionation columns in their respective lateral halves.

5. An apparatus for fractionating chemical compounds which comprises:

(a) an enclosed, vertically aligned cylindrical outer vessel having an upper end, a lower end, an internal volume, and first and second lateral halves, with the first and second lateral halves being located on the opposing sides of a vertical plane passing through the internal volume of the outer vessel;

(b) an inlet conduit communicating with the internal volume of the outer vessel at a point intermediate the upper and lower ends of the outer vessel;

(c) a liquid inlet nozzle attached to the inlet conduit and located within the outer vessel in the first lateral half of the vessel;

(d) outlet conduits communicating with the internal volume of the outer vessel at the upper and lower end of the outer vessel wherein said bottom outlet conduit communicates solely with said first lateral half of said internal volume;

(e) a reboiling means operatively associated with the lower end of the outer vessel;

(f) a condensing means for supplying reflux liquid to the upper end of the outer vessel;

(g) vapor-liquid contacting means operatively distributed within the internal volume of the outer vessel at points above and below the inlet conduit;

(h) an adjustable liquid collection and distribution means comprising a means to collect liquid flowing downward through vapor-liquid contacting means located immediately above the inlet conduit, and comprising means to deliver a variable portion of the collected liquid to each of the first and second lateral halves of the vessel at the level of the inlet conduit;

(i) a liquid segregation means which divides the liquid flowing downward through vapor-liquid contacting means located below the inlet conduit into two separate internal liquid streams, with a first internal liquid stream being confined to the first lateral half of the outer vessel and a second internal liquid stream being confined to the second lateral half of the outer vessel, the liquid segregation means having open passageways allowing vapor flow between the first and second lateral halves of the vessel;

(j) a liquid collection trap located in the second lateral half of the vessel below the liquid inlet nozzle and above said lower end of said internal volume; and, (k) a liquid sidedraw outlet conduit in communication with the liquid collection trap.

6. The apparatus of claim 5 further characterized in that the vapor-liquid contacting means comprises a high surface area packing material.

7. The apparatus of claim 5 further characterized in that the vapor-liquid contacting means comprise fractionation trays, and the fractionation trays located between the liquid inlet nozzle and the liquid collection trap are two-pass fractionation trays.

8. The apparatus of claim 7 further characterized in that the liquid segregation means comprises a plurality of vertical imperforate baffles, with a baffle being located on alternate fractionation trays each of which has two outlet downcomers associated therewith, and wherein the baffle extends upward from the upper surface of the fractionation tray on which it is located to an elevation above the upper surface of the fractionation tray immediately above, and the baffle is located within the single outlet downcomer associated with the fractionation tray immediately above.

9. The apparatus of claim 8 further characterized in that the liquid collection and distribution means comprises a fractionation tray having a blanked-off downcomer, a tubular conduit attached to said blanked-off downcomer which branches into two distribution conduits, and a valve located in each of the distribution conduits.

10. The apparatus of claim 7 further characterized in that there are at least three fractionation trays located between the liquid inlet nozzle and the liquid collection trap, and in that the liquid segregation means extends downward from the tray immediately below the liquid inlet nozzle to the liquid collection trap.

* * * * *